Patented Feb. 28, 1928.

1,660,434

UNITED STATES PATENT OFFICE.

JAMES M. CORY AND FRED H. BUNKE, OF LIMA, OHIO, ASSIGNORS TO THE SOLAR REFINING COMPANY, OF LIMA, OHIO, A CORPORATION OF OHIO.

METHOD OF DISPOSING OF SPENT CLAY IN REFINING PLANTS.

No Drawing.   Application filed January 27, 1926.   Serial No. 84,164.

This invention relates to a method of disposing of spent clay in refining plants and is a companion application of our application executed even date herewith, the object being to provide a method by means of which spent clay used as a filtering medium in refining oils can be converted into a liquid fuel and consumed.

The usual method of disposing of spent or used clay is to burn the same with coal under a still or boiler or such other equipment as desired to obtain the heat from the oil remaining therein.

In oil refining plants, in carrying out the process of refining or brightening hydrocarbon, vegetable or similar oils, a filtering medium such as coke, coal dust, clay, fullers' earth, bauxite plaster of Paris or other similar products is used and after being used this filtering medium is either burned, washed, roasted or destroyed.

In carrying out our method of disposing of a filtering medium, such as spent clay, to produce a liquid fuel, the spent clay is conveyed from the press or percolator into a mixing tank by a conveyor or any other suitable means. The clay deposited therein is then mixed with a substance known to the trade as tank bottoms, low gravity fuel oil or other similar carrying fluid or medium and thoroughly agitated. The amount of carrying medium or oil employed depends upon the quality of the oil and the density of the fuel desired. The liquid fuel is pumped directly from the tank to the burner or may be stored in a tank by continuously agitating the same in the storage tank, which is preferably heated to maintain the fuel in such condition that it will burn satisfactorily in a liquid fuel burner.

The mixture of filtering medium and carrying medium which has been thoroughly agitated to produce a liquid fuel may or may not be heated either with open steam, discharging live steam or exhaust steam into the fuel or by closed steam coils or by any other heating devices, as we have found it to be good practice to heat the material to the temperature at which it is easily conveyed by a pump, varying from 60° to 220° F., depending upon the fluxing material used.

While we have not shown an apparatus for carrying out our method, any suitable vessel or tank can be employed into which the spent clay or other filtering medium can be deposited and the oil can be pumped or conveyed to the tank by any suitable means, the two being thoroughly mixed together so as to produce a liquid fuel of such a consistency that it will burn satisfactorily in a liquid fuel burner which is preferably disposed under the still or boiler of the refining plant so that the waste products can be utilized and disposed of.

From the foregoing description it will be seen that we have provided a method of disposing of a filtering medium in a refining plant by forming a liquid fuel out of the same so that the fuel can be used in a refinery.

What we claim is:

1. A liquid fuel composed of spent clay and oil thoroughly mixed together.

2. A liquid fuel composed of a filtering medium and a hydrocarbon fluxing medium thoroughly mixed together.

3. The method of disposing of a filtering medium in oil refining plants consisting in depositing the filtering medium in a tank, introducing oil into the tank and thoroughly mixing the oil and filtering medium to produce a liquid fuel and burning the liquid fuel in a liquid fuel burner.

In testimony whereof we hereunto affix our signatures.

JAMES M. CORY.
FRED H. BUNKE.